US005459859A

United States Patent [19]

Senda

[11] Patent Number: 5,459,859
[45] Date of Patent: Oct. 17, 1995

[54] APPARATUS AND SYSTEM FOR PROVIDING INFORMATION REQUIRED FOR MEETING WITH DESIRED PERSON WHILE TRAVELLING

[75] Inventor: Kimihiro Senda, Kumamoto, Japan

[73] Assignee: Mitsubishi Denki Kabushiki Kaisha, Tokyo, Japan

[21] Appl. No.: 898,787

[22] Filed: Jun. 15, 1992

[30] Foreign Application Priority Data

Jun. 18, 1991 [JP] Japan .................................... 3-171931

[51] Int. Cl.$^{6}$ .................................................. G06F 7/10
[52] U.S. Cl. .......................... 395/600; 364/270; 364/407
[58] Field of Search ................................ 364/407, 918.6, 364/272; 395/600

[56] References Cited

U.S. PATENT DOCUMENTS

| | | | |
|---|---|---|---|
| 4,992,940 | 2/1991 | Dworkin | 364/401 |
| 5,084,819 | 1/1992 | Dewey et al. | 364/419.2 |
| 5,086,394 | 2/1992 | Shadira | 364/419.2 |
| 5,088,052 | 2/1992 | Spielman et al. | 395/158 |
| 5,164,897 | 11/1992 | Clack et al. | 364/401 |
| 5,210,868 | 5/1993 | Shimada et al. | 395/600 |
| 5,226,177 | 6/1993 | Nickerson | 455/2 |
| 5,227,970 | 7/1993 | Harris | 364/419.1 |
| 5,253,165 | 10/1993 | Leiseca et al. | 364/407 |

FOREIGN PATENT DOCUMENTS

| | | |
|---|---|---|
| 0276425A3 | 8/1988 | European Pat. Off. . |
| 2017360 | 10/1979 | United Kingdom . |
| 2017988 | 10/1979 | United Kingdom . |
| WO89/07798 | 8/1989 | WIPO . |
| WO90/13828 | 11/1990 | WIPO . |

OTHER PUBLICATIONS

"The Computer Personals: Meeting Your Match Online" by Cheryl A. Meyer, Link-Up, vol. 1, No. 10, Jul. 1984, pp. 38–40.

*Primary Examiner*—Thomas G. Black
*Assistant Examiner*—Cuan Pham
*Attorney, Agent, or Firm*—Lowe, Price, LeBlanc & Becker

[57] ABSTRACT

Disclosed is an apparatus and a system for providing information required for meeting with a desired person while travelling. A subscriber registers his or her attribute data, attribute data of a desired person and his or her travel schedule data through an input/output terminal. Input data is transferred via a communication network to a host computer. Host computer generates information regarding the other party who the subscriber can meet with for each subscriber by processing data transferred from many subscribers. Generated data is stored in an output list file, so that the subscriber is able to know a possibility to meet with a desired person while travelling by making access to the output list file through the input/output terminal.

13 Claims, 17 Drawing Sheets

FIG.3

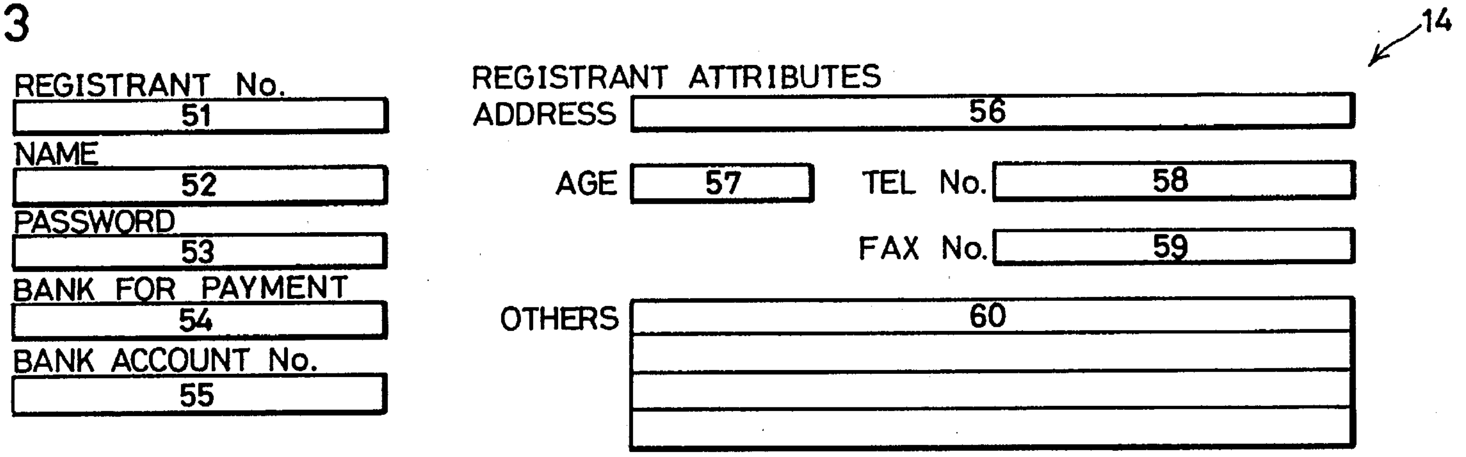

THE CONTENTS REGISTERED ATTRIBUTES 61

| No. | | | | | | |
|---|---|---|---|---|---|---|
| 01 | FL | BIRTHPLACE | HIROSHIMA PREF. | HIROSHIMA CITY | FUNAIRI | |
| 02 | L | ALMA MATER | HIROSHIMA MUNICIPAL | FUNAIRI JUNIOR HIGH SCHOOL | GRADUATED IN 1985 | |
| 03 | | ALMA MATER | HIROSHIMA PREFECTURAL | FUNAIRI HIGH SCHOOL | GRADUATED IN 1988 | (±2 yrs.) |
| 04 | | ALMA MATER | NATIONAL | KYOTO UNIVERSITY | GRADUATED IN 1992 | |
| 05 | L | FAMILY | TOKUSHIMA | USHIJIMA | NAKAI FAMILY | |
| 06 | | FAMILY | HIROSHIMA | YAMAGATA PREF. | SENDODA FAMILY | |
| 07 | | ART | MUSIC | OPERA | ITALIAN | |
| 08 | | SPORTS | SWIMMING | BREASTSTROKE | 200m | |
| 09 | | | | | | |

REGISTRATION CODE TABLE 62

| | | | | |
|---|---|---|---|---|
| 1 | 043 | 0127 | 0 | 08 |
| 3 | 043 | 0274 | 3 | 60 |
| 3 | 043 | 0513 | 3 | 63 |
| 3 | 028 | 0004 | 3 | 67 |
| 2 | 054 | 0405 | N | NAKAI |
| 2 | 043 | 0207 | N | SENDODA |
| | | | | |
| | | | | |
| | | | | |

FIG.4

15

GUIDANCE

| AREA CODE | PEFECTURE | COUNTY | CITY/ TOWN DISTRICT | LOCATION |
|---|---|---|---|---|
| 01 HOKKAIDO | 01 FUKUOKA | 01 YAMAKA · KIKUCHI | 01 UEKI-CHO | 01 ASAKURI |
| 02 TOHOKU | 02 OITA | 02 ICHINOMIYA | 02 NISHIGOSHI-CHO | 02 MIRIKI |
| 03 HOKURIKU | 03 SAGA | 03 TAMANA · ARAO | 03 OTSU-CHO | 03 TATSUTA |
| 04 KANTO | 04 KUMAMOTO | 04 KUMAMOTO | 04 KIKUYO-CHO | 04 HARAMIZU |
| 05 KINKI | 05 MIYAZAKI | 05 YABE | 05 KAWACHI-CHO | 05 SHINKAWA |
| 06 CHUGOKU | 06 KAGOSHIMA | 06 UJO | 06 KUMAMOTO CITY | 06 KUMADE |
| 07 SHIKOKU | | 07 YASHIRO | 07 NISHIHARAMURA | 07 KUBOTA |
| 08 KYUSHU | | 08 HITOYOSHI · KUMA | 08 MASUKI-CHO | |
| | | 09 MINAMATA | 09 AKUTA-CHO | |
| | | 10 AMAKUSA | 10 KOUSA-CHO | |

63

FIG.6

1 EXAMPLE OF MOVEMENT DATA (MOVING FROM POINT A TO POINT B)

| STARTING DATE TIME | END DATE TIME | STARTING AREA | PREFECTURE | TRANSPORTATION | SERVICE NO. | DEPARTURE STATION (NAME OF PLACE) | ARRIVAL STATION (NAME OF PLACE) |
|---|---|---|---|---|---|---|---|
| 10.10.90 15:20 | 10.10.90 18:10 | KINKI | TOKYO | AIRPLANE | 007 | KUMAMOTO | OITA |
| | | CHUGOKU | KYOTO | BOAT | 523 | AOKIHAMA | BEPPU |
| | | KYUSHU | AOMORI | TRAIN | WHITE | KENCHOMAE | ITAMI |
| | | SHIKOKU | HIROSHIMA | EXPRESS BUS | TSUBAME 5 | TOKYO | IMABARI |
| | | | | | HINOKUNI 38 | | |
| | | | | | MYOJO | | |

FIG.7

2 EXAMPLE OF LOCATION DATA ( WITHIN A CERTAIN RANGE )

| ARRIVAL DATE TIME | DEPARTURE DATE TIME | AREA | PEFECTURE | COUNTY /CITY | TOWN/ DISTRICT | SITE | NAME OF SITE | COMMUNICATION MEANS |
|---|---|---|---|---|---|---|---|---|
| 90.10.08 18:30 | 90.10.09 09:30 | KINKI | TOKYO | OGATA | OGUCHI | HOTEL | HOTEL PRINCE | |
| | | CHUGOKU | KYOTO | OGUNI | NAKAYAMA | PLAZA | | |
| | | KYUSHU | AOMORI | NAKANA | | AMUSEMENT PARK | | |
| | | SHIKOKU | HIROSHIMA | | | SIFT FOR EXHIBITION | | |
| | | | | | | AIRPORT | | |
| | | | | | | HARBOR | | |

FIG.8

OUTPUT LIST OF MR. A

91

| | | |
|---|---|---|
| OCT. 10 1990 | 8:30 KUMAMOTO AIRPORT ANA522<br>10:30 FLOWER EXPOSITION UNTIL 16:30<br>18:00 HOTEL PRINCE OSAKA (ARRIVAL) | |
| OCT. 11 | 9:30 HOTEL PRINCE (DEPARTURE)<br>10:00 HANKYU EXPRESS TRAIN FOR KAWARAMACHI, KYOTO<br>11:00 HEIAN SHRINE, KYOTO UNTIL 12:00<br>16:00 JR SANYO FOR OSAKA<br>18:00 HOTEL PRINCE OSAKA (ARRIVAL) | MR. B : 10:00 KUMAMOTO AIRPORT ANA524<br>MR. B : 12:30 KIYOMIZU TEMPLE, KYOTO |
| OCT. 12 | 9:00 HOTEL PRINCE OSAKA (DEPARTURE)<br>9:30 HANKYU EXPRESS TRAIN FOR KOBE<br>10:30 MT. ROKKO BY CABLE CAR<br>12:00 MT. ROKKO UNTIL 14:00<br>16:00 HOTEL KOYO, ARIMAONSEN (ARRIVAL) | MR. B: FLOWER EXPOSITION (12:00~17:00)<br>MR. E: FLOWER EXPOSITION (14:00~18:00)<br>MR. B: HOTEL PRINCE OSAKA (ARRIVAL) 18:00 |
| OCT. 13 | 9:00 HOTEL KOYO, ARIMAONSEN (DEPARTURE)<br>9:30 KOBE EXPRESS TRAIN FOR SANNOMIYA<br>10:20 IJINKAN, KOBE UNTIL 10:50<br>11:00 DAIOJI ZOO UNTIL 13:00<br>14:00 AIRPORT LIMOUSINE (MIYOSHI TO OSAKA AIRPORT)<br>18:55 OSAKA AIRPORT ANA529 | MR. B: HOTEL PRINCE OSAKA (DEPARTURE) 9:00<br>MR. B: FLOWER EXPOSITION (10:00~14:00)<br>MR. B: 16:00 OSAKA AIRPORT ANA527 |

92 93

94

MR. B'S DATA

GRADUATE OF KUMAMOTO KOGYO HIGHSCHOOL IN THE SAME CLASS OF THE YEAR 1997

ADDRESS —— —— ——

TEL. NO. 096-339-8485

MR. E'S DATA

2-YEAROLDER GRADUATE OF KYOTO KOGEI COLLEGE, JAPANESE ART DEPARTMENT

ADDRESS —— —— ——

TEL. NO. 03-448-2244

FIG. 9

OUTPUT LIST OF MR. B

95

| | | |
|---|---|---|
| OCT. 10 1990 | | MR. A : 8:30 KUMAMOTO AIRPORT ANA522<br>MR. A : FLOWER EXPO. (10:30 ~ 16:30)<br>MR. A : 18:00 HOTEL PRINCE OSAKA (ARRIVAL) |
| OCT. 11 | 10:00 KUMAMOTO AIRPORT ANA524<br>11:30 AIRPORT LIMOUSINE FOR KYOTO<br>12:30 SIGHTSEEING IN KIYOMIZU TEMPLE UNTIL 14:00<br>18:30 HOTEL MIYAKO, KYOTO (ARRIVAL) | MR. A : 9:30 HOTEL PRINCE (DEPARTURE)<br>MR. A : 11:00 HEIAN SHRINE. KYOTO<br>MR. A : 18:00 HOTEL PRINCE (ARRIVAL) |
| OCT. 12 | 9:00 HOTEL MIYAKO (DEPARTURE)<br>10:00 EXPRESS FROM HANKYU KAWARAMACHI TO OSAKA<br>12:00 FLOWER EXPOSITION UNTIL 17:00<br>18:00 HOTEL PRINCE OSAKA (ARRIVAL) | MR. A : 9:00 HOTEL PRINCE (DEPARTURE)<br>MR. X : FLOWER EXPO. (10:00~14:00) |
| OCT. 13 | 9:00 HOTEL PRINCE (DEPARTURE)<br>10:00 FLOWER EXPOSITION UNTIL 14:00<br>16:30 OSAKA AIRPORT ANA527 | MR. W : FLOWER EXPO. (9:00 ~ 16:00)<br>MR. A : 18:55 OSAKA AIRPORT ANA529 |

96 97 98

MR. A'S DATA
GRADUATE OF KUMAMOTO KOGYO HIGHSCHOOL IN THE SAME CLASS OF THE YEAR 1997
ADDRESS ——— ——— ———
TEL. NO. 096-228-8282

MR. X'S DATA
FROM THE SAME TOWN OYAMA-CHO, OTAKE CITY, HIROSHIMA PREF. (AGF 58)
ADDRESS ——— ——— ———
TEL. NO. 0823-23-2323

MR. W'S DATA
RELATIVE ON THE MOTHER'S SIDE
ADDRESS ——— ——— ———
TEL. NO. ——— ——— ———

APPARATUS AND SYSTEM FOR PROVIDING INFORMATION REQUIRED FOR MEETING WITH DESIRED PERSON WHILE TRAVELLING

BACKGROUND OF THE INVENTION

1. Field of the Invention

The present invention relates generally to an information providing system using a communication network and, more particularly, to an information providing apparatus and system for providing registered subscribers with information required for meeting with desired people while travelling.

2. Description of the Background Art

Recently, with development of transportation systems such as airplanes, railroads, expressways and freeways, there are increasing opportunities for many people in general as well as businessmen to make a trip or travel by means of transportation. In particular, it takes long to travel abroad or some distant domestic areas, and hence, fruitful and enjoyable trips or travels are desired. In general, main purposes of travels are mostly definite and clear. There are, however, some cases where some people or some travellers wish to meet with unknown people in far distance (including people in native areas and travellers), which may be a secondary purpose for them though. There is a case, for example, where one wish to know a person who he or she has not met yet but who has common interests or common experiences. Further, there is a case where even if one does not plan to travel, he or she desires to meet an unknown person (desired person) on travel.

Conventionally, however, there has been no information providing system for providing effective information to people who expect to meet with unknown people on travels. Those who expect such meeting could not have easily met with desired people while travelling.

SUMMARY OF THE INVENTION

One object of the present invention is therefore to provide an apparatus and system for providing information required for meeting with a desired person while travelling.

Briefly, an information providing apparatus according to the present invention includes attribute/schedule storing means for storing for each subscriber, attribute data and schedule data of a subscriber, and attribute data of a person expected to meet, subscriber selecting means for selecting a specific subscriber having common attribute data and common schedule data among subscribers by reference to the attribute/schedule storing means, information accumulating means for accumulating information as to the expected person for each subscriber selected by the subscriber selecting means, and information providing means for providing subscribers via a communication network with the information accumulated by the information accumulating means.

In operation, the attribute data and schedule data of a subscriber and the attribute data of an expected person are stored in advance in attribute/schedule storing means for each subscriber who expects to meet with a desired person while travelling. The subscriber selecting means selects a specific subscriber having common attribute data and common schedule data among subscribers by referring to the attribute/schedule storing means. The information as to the expected person is accumulated for each selected subscriber by the information accumulating means. The information providing means provides subscribers via a communication network with the accumulated information.

According to another aspect of the present invention, an information providing system includes a plurality of input/output terminal units for accesses by a plurality of subscribers, and a host computer connected via a communication network to the plurality of input/output terminals, for generating for each subscriber, information required for meeting with a desired person while travelling by a processing of the information provided. The host computer includes attribute/schedule storing means for storing for each subscriber attribute data and schedule data of a subscriber and attribute data of an expected person which are applied from the input/output terminals, subscriber selecting means for selecting a specific subscriber having common attribute data and common schedule data among subscribers by referring to the attribute/schedule storing means, information accumulating means responsive to the subscriber selecting means for accumulating information as to the expected person for each selected subscriber, and information transfer means responsive to a request from a subscriber applied through the input/output terminals for transferring information as to the other party of a corresponding subscriber, accumulated by the information accumulating means, to a corresponding input/output terminal. The information of the other party of the corresponding subscriber, transferred from the information transfer means, is displayed on a display unit provided in the corresponding input/output terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram of a display of a data input area 14 shown in FIG. 2.

FIG. 4 is a diagram of a display of a guidance area 15 shown in FIG. 2.

FIG. 6 is a diagram of data showing several examples of movement data input as schedule data.

FIG. 7 is a diagram of data showing an example of the contents of location data input as schedule data.

FIG. 8 is an output list showing an example of an output list of a certain user Mr. A.

FIG. 9 is an output list showing an example of an output list of another user Mr. B.

DESCRIPTION OF THE PREFERRED EMBODIMENTS

Figure 1:
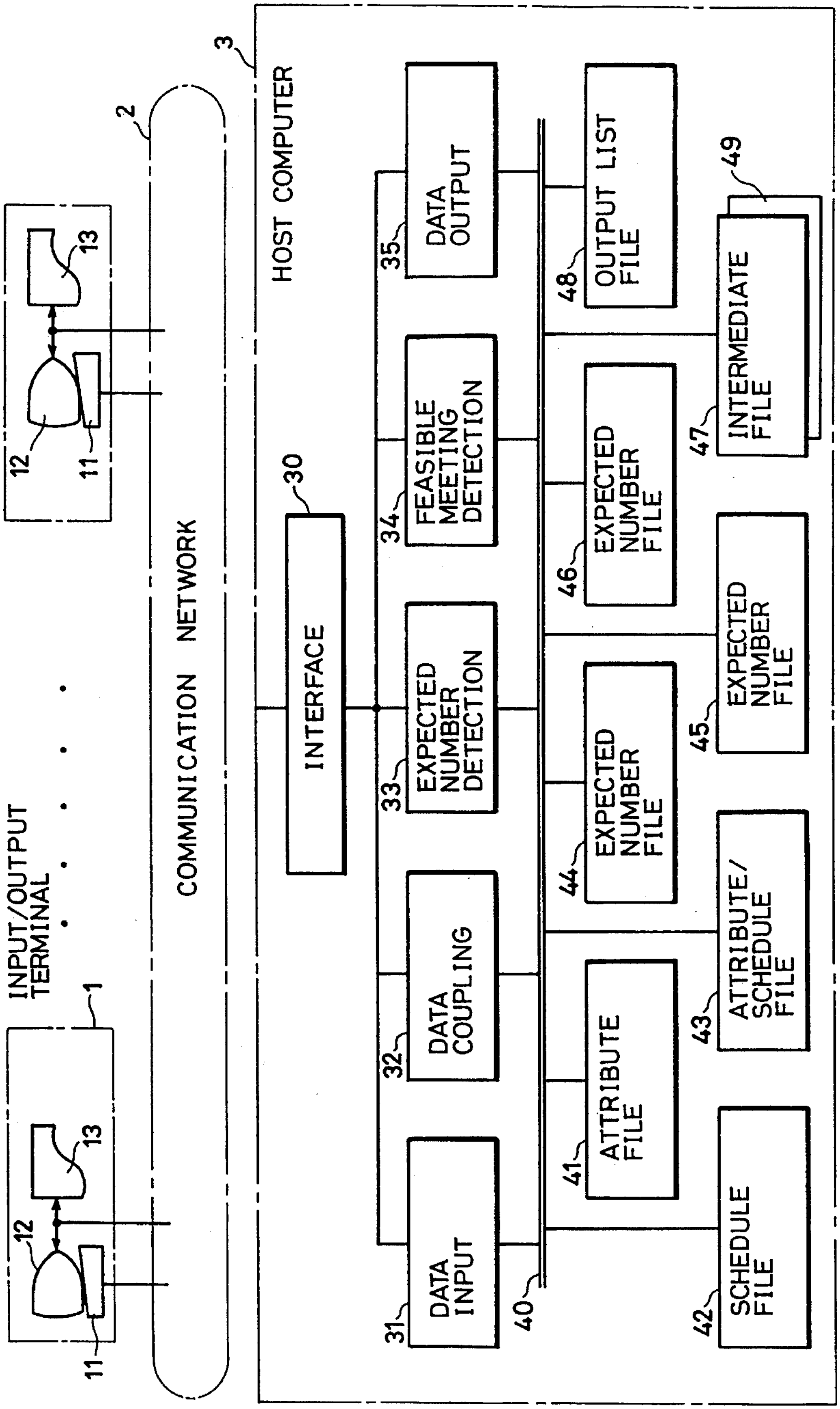
FIG. 1 is a block diagram of an information providing system showing one embodiment of the present invention.

FIG. 1 is a block diagram of an information providing system showing one embodiment of the present invention. With reference to FIG. 1, this information providing system includes a large number of input/output terminals 1 for use in accesses by many subscribers, and a host computer 3 connected via a communication network 2 to input/output terminals 1. One input/output terminal 1 includes a keyboard (or touch panel) unit 11 for use in an input of data and commands by subscribers, a CRT display unit 12, and a printer 13. Communication network 2 is implemented by, for example, an integrated service digital network (ISDN) and/or a telephone network, and in some case, by a local area network (LAN) and the like.

Host computer 3 includes a data input processor 31, a data coupling processor 32, an expected number detecting processor 33, a feasible meeting detecting processor 34, and a data output processor 35. In this embodiment, those processors 31 to 35 are implemented with software or programming and are connected via an interface unit 30 to communication network 2. Host computer 3 further includes an attribute file 41, a schedule file 42, an attribute/schedule file 43, expected number files 44, 45 and 46, intermediate files 47 and 49, and an output list file 48. These files 41 to 48 are formed in a random accessible memory such as, for example, a magnetic disc unit. Those files 41 to 48 are connected via a bus line 40 to processors 31 to 35.

While a detailed description will be made later as to processors 31 to 35 and files 41 to 48 provided in host computer 3, the following description will first be made on a manner of use of the information providing system shown in FIG. 1 for the purpose of a schematic description of the information providing system.

Figure 2:
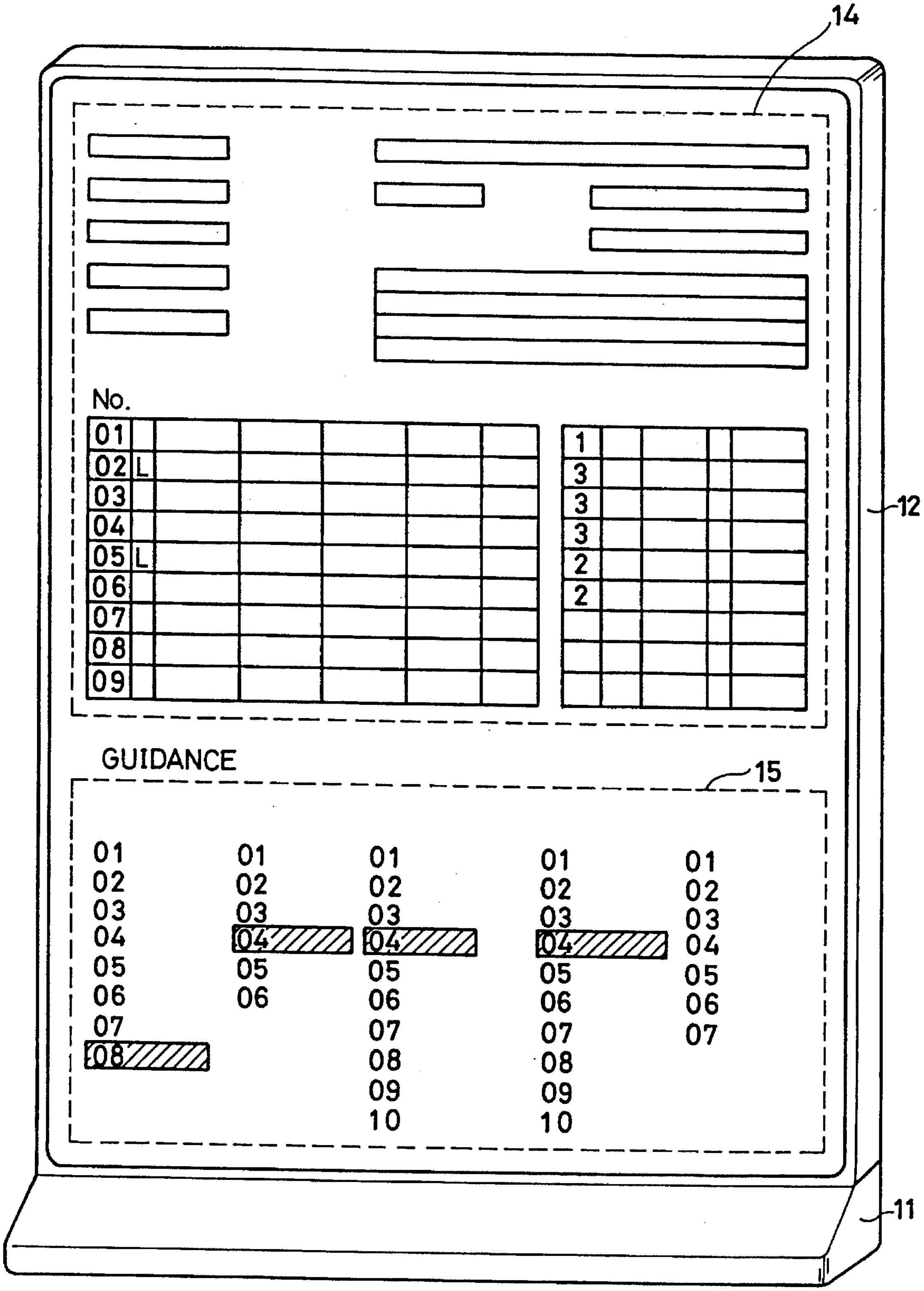
FIG. 2 is a diagram of a display showing one example displayed on a display unit when attribute data is entered.

FIG. 2 is a diagram showing one example displayed on display unit 12 when attribute data is input. With reference to FIG. 2, a data input area 14 is used when a subscriber inputs his or her attributes and attributes of an expected person, i.e., the other party. A guidance area 15 is displayed for assistance in data inputs to data input area 14 by the subscriber. Respective examples of displays of data input area 14 and guidance area 15 are shown in FIGS. 3 and 4, respectively.

With reference to FIG. 3, data input area 14 includes a column 51 to which registration numbers are input, a column 52 to which registrants' names are input, a column 53 to which passwords are input, a column 54 to which the names of banks specified for payment are input, a column 55 to which bank account numbers are input, a column 56 to which registrants' addresses are input, a column 57 to which registrants' ages are input, a column 58 to which telephone numbers are input, a column 59 to which facsimile numbers are input, and a column 60 to which registrants' other information are input.

Various attribute data indicating a range for receiving of information providing services are input to a column 61. Data regarding attributes of an expected person such as, for example, birthplace data, alma mater data, family data, origins data and interest data are input to column 61. The example shown in FIG. 3 indicates birthplace data, alma mater data, family data, art data and sports data as his or her likings. Various registration codes are input to a column 62.

While a data input to data input area 14 shown in FIG. 3 is carried out by keyboard unit 11, guidance area 15 shown in FIG. 4 is used for input assistance in order to reduce the workload of data input. That is, with the use of a guidance display, data which is prepared in advance in guidance area 15 is displayed, and a user can easily make a data input by shifting a cursor to the displayed data. Various data for use in reducing the data input workload are prepared in guidance display area 15 if required. An input of unprepared data is made by a key entry through keyboard unit 11.

In another example, a map is displayed on display unit 12, and area (region) data is input by repetition of instructions of a desired area or region. The displayed map is changed in sequence from a large-scale map to a small-scale map, and the repeating of instructions allows an input of hierarchical regional data.

In a case, for example, where a person expects to meet another person of the same birthplace on journeys, birthplace data is input as expected attribute data. The birthplace data is allowed to designate regions from a larger range to a smaller range in sequence. While nationality data is also allowed to be input in a case where an international network is formed, only area data which is more detailed than to/do/fu/ken (urban and rural prefectures) data in Japan is displayed in the example shown in FIG. 2. In a case where the birthplace of a certain user is 4-chome, Funairi-cho, Hiroshima-shi, Hiroshima-ken (4, Funairi Town, Hiroshima City, Hiroshima Prefecture), if the user wishes to meet as his or her target a person who comes from the same town as the user's, birthplace data representing "Hiroshima Prefecture", "Hiroshima City" and "Funairi Town" is input into the column of birthplaces as shown in FIG. 3. If the input birthplace data includes data representing "4-chome", those (registrants) who come from Funairi Town other than from 4-chome are excluded from targets for retrieval.

Alma mater data is input in a case where a meeting with graduates from the same school is expected. In this case, data representing the name of alma mater, data representing the year of graduation or data representing the range of graduation year is input. The graduation year range data defines the range of the year when a person who is expected to meet graduated from his or her school. If the graduation year data is not input, all graduates from a specified school are targets for retrieval.

Family data is input in a case where a meeting with a person of the same origin such as, for example, the Kishu clan, a branch of the Tokugawa clan, or one's kin or relative is expected. Data representing the cradle of his or her family (or data representing the names of places closely related to the family in history) and data representing family names are input in some cases.

In addition, in a case where a meeting with a person who has the same taste or liking, i.e., the same interest and/or sports as the user's is expected, interest data and/or sports data of the expected person are input. In the example shown in FIG. 3, "music" ("Italian opera" in further detail) and "swimming" (200-meter breaststroke in further detail) are input as art data and sports data, respectively.

As other attribute data of registrants, occupation data, data representing such experience as a detention in Siberia, and age data, for example, can be included.

For a retrieval mask FL, with an input of a flag "L", retrieval data provided with that flag "L" is not employed in a retrieval processing. That is, although data is input as expected attribute data, the input of flag "L" prevents specified data from limiting a person who is expected to meet. In other words, data which has once been excluded from a target for retrieval can be easily returned as an item for retrieval by removal of flag "L".

Figure 5:
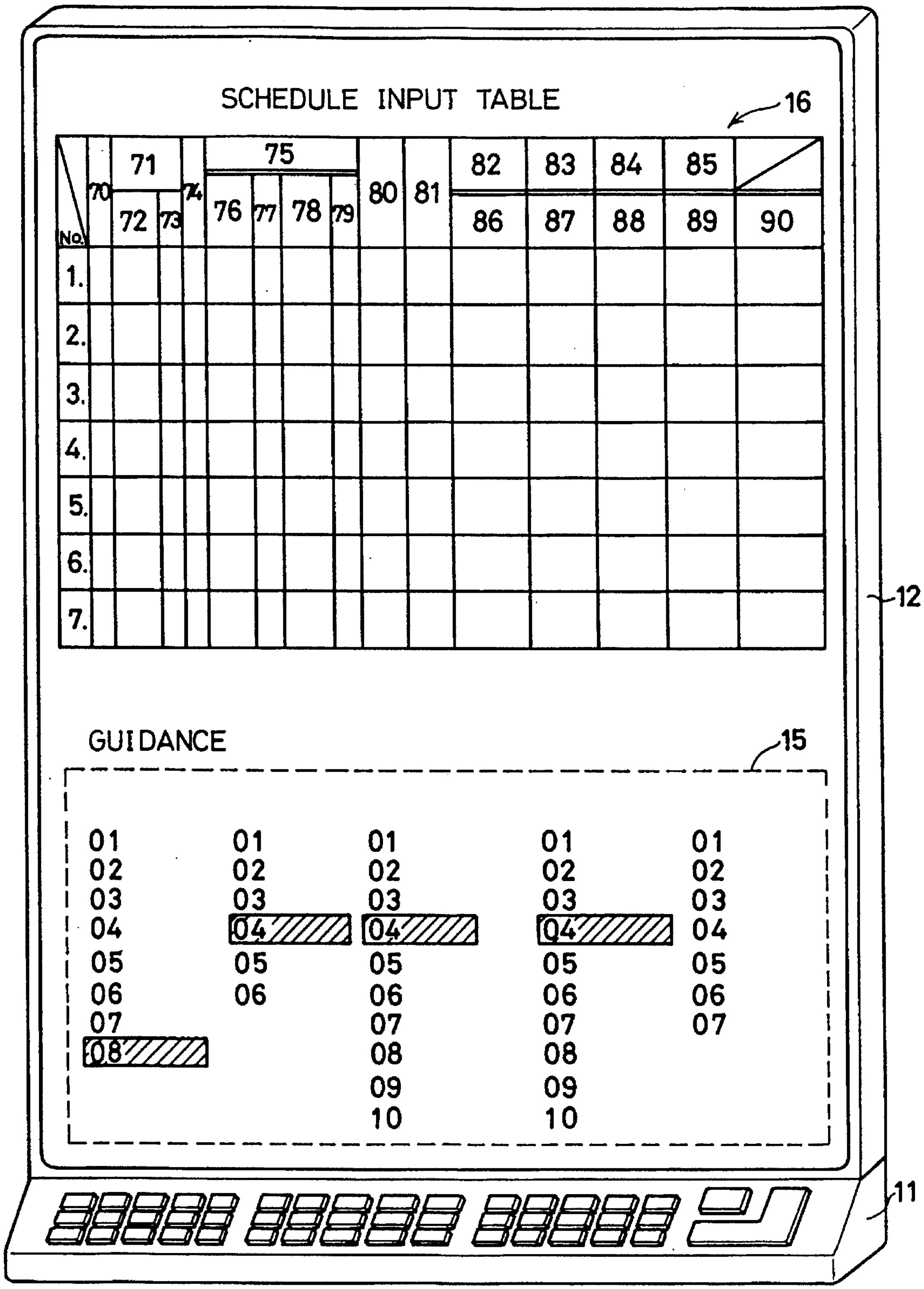
FIG. 5 is a diagram of a display showing one example displayed on the display unit when schedule data is input.

FIG. 5 is a diagram of a display showing one example displayed on display unit 12 when schedule data is input. A data input area 16 is provided with columns for use in inputs of various data which will be described below. In order to indicate data to be input in blank-space columns in data input area 16, columns 70 to 90 include the following indications. Column 72 has an indication of "retrieval mask flag"; column 71, "date"; column 72, "date/month/year"; column 73, "margin"; column 74, "schedule partition"; column 75, "time"; column 76, "departure"; column 77, "margin"; column 78, "arrival"; and column 79, "margin."

Further, column 80 has an indication of "area"; column 81, "to/do/fu/ken (urban and rural prefectures)"; column 82, "means of transport"; column 83, "flight (or train, bus etc.) service number"; column 84, "departure station (the name of area)"; column 85, "arrival station (the name of area)"; column 86, "gun (county)"; column 87, "shi/cho/son (city/town/district)"; column 88, "the name of town/district"; column 89, "location"; and column 90, "communication means."

Schedule data that can be changed depending on date and time are input in corresponding blank-space columns represented by columns 73, 77 and 79 where "margin" is indicated. That is, in a case where schedule is not determined yet or a case where schedule is alterable if necessary, data for determining the alterable number of days and time periods is allowed to be input in a corresponding blank column. In a retrieval processing which will be described later, targets to be retrieved are increased by referring to those margin data, resulting in an increase in probability that an expected person is discovered.

Corresponding data indicated in columns 70 to 90 are input in the blank-space columns in data input area 16 shown in FIG. 5. A data input is carried out through keyboard 11 by utilizing guidance area 15 as in the case with attribute data input shown in FIG. 3. Schedule data includes movement data for determining a schedule of the user when the user moves from a point X to another point Y, and location data for determining a schedule of the user's stay in the future such as a site for exhibition, accommodations and a waiting room in the airport. It is pointed out that both the movement data and the location data include time data and place data constituting schedule data. An example of movement data is shown in Table 1 below.

TABLE 1

| Movement data (from point X to point Y) | |
|---|---|
| (1-1) Starting of location | October 8, 1990 9:55 a.m. |
| (1-2) End of movement | October 8, 1990 10:55 a.m. |
| (2-1) Starting point: Area | Kyushu |
| (2-2) Prefecture | Kumamoto |
| (3-1) Transportation means | Airplane |
| (3-2) Flight No. | ANA 522 |
| (3-4) Departure station (Name of town) | Kumamoto Airport |

TABLE 1-continued

| Movement data (from point X to point Y) | |
|---|---|
| (3-5) Arrival station (Name of town) | Itami Airport |

An example of location data is shown in Table 2 below.

TABLE 2

| Location data (in a certain area) | | |
|---|---|---|
| (1-1) | Starting of location | October 8, 1990 6:30 p.m. |
| (1-2) | End of location | October 9, 1990 9:30 a.m. |
| (2-1) | Area | Kinki |
| (2-2) | Prefecture | Osaka |
| (2-3) | County/city | Osaka |
| (2-4) | City/town | Osaka-City |
| (2-5) | Town/district | Sakai |
| (3-1) | Starting place | Hotel Prince |
| (3-2) | Communication means | Tel.No. 06-232-5678 |

FIG. 6 is a diagram showing data representing several examples of movement data input as schedule data. FIG. 7 is a diagram showing data representing several examples of location data input as schedule data. It is pointed out that other various data are allowed to be used as movement data and location data besides the examples shown in FIGS. 6 and 7.

As described above, after attribute data is input by reference to data input area 14 shown in FIG. 3 and schedule data is also input by reference to data input area 16 shown in FIG. 5, a retrieval processing including data input by many other subscribers is executed by host computer 3 shown in FIG. 1. While this retrieval processing will be described subsequently in detail, the following description will first be made on an example of an output list which is finally output by display unit 12 and/or printer 13.

In the following example, assume that a certain user, Mr. A has a registration schedule shown in Table 3 below.

TABLE 3

| Mr. A's registered schedule | | |
|---|---|---|
| Oct. 10 1990 | 8:30 | Kumamoto Airport: ANA522 |
| | 10:30 to 16:30 | Flower Exposition |
| | 18:00 | Hotel Prince Osaka (Arrival) |
| Oct. 11 | 9:30 | Hotel Prince Osaka (Departure) |
| | 10:00 | Hankyu Railway Express for Kawaramachi, Kyoto |
| | 11:00 to 12:00 | Heian Shrine, Kyoto |
| | 16:00 | Japan Railway Sanyo for Osaka |
| | 18:00 | Hotel Prince Osaka (Arrival) |
| Oct. 12 | 9:00 | Hotel Prince Osaka (Departure) |
| | 9:30 | Hankyu Railway Express for Kobe |
| | 10:30 | Mt. Rokko by cable car |
| | 12:00 to 14:00 | Top of Mt. Rokko |
| | 16:00 | Hotel Koyo in Arima Onsen (Arrival) |
| Oct. 13 | 9:00 | Hotel Koyo in Arima Onsen (Departure) |
| | 9:30 | Kobe Railway Express for Sannomiya |
| | 10:20 to 10:50 | Ijinkan in Sannomiya, Kobe |

TABLE 3-continued

| Mr. A's registered schedule | |
|---|---|
| | 11:00 to Daiohji Zoo 13:00 |
| | 14:00 From Miyoshi to Osaka Airport by Airport limousine |
| | 18:55 Osaka Airport: ANA529 |

In addition, assume that another user, Mr. B has a registration schedule shown in Table 4 below.

TABLE 4

| Mr. B's registered schedule | |
|---|---|
| Oct. 11 1990 | 10:00 Kumamoto Airport: ANA524 |
| | 11:30 For Kyoto by Airport Limousine |
| | 12:30 Sightseeing in Kiyomizu to Temple, Kyoto 14:00 |
| | 18:30 Hotel Miyako, Kyoto (Arrival) |
| Oct. 12 | 9:00 Hotel Miyako, Kyoto (Departure) |
| | 10:00 Express from Hankyu Kawaramachi to Osaka |
| | 12:00 to Flower Exposition 17:00 |
| | 18:00 Hotel Prince Osaka (Arrival) |
| Oct. 13 | 9:00 Hotel Prince Osaka (Departure) |
| | 10:00 to Flower Exposition 14:00 |
| | 16:30 Osaka Airport: ANA527 |

FIG. 8 is a diagram of an output list showing an example of an output list of the user, Mr. A. FIG. 9 is a diagram of an output list showing an example of an output list of another user, Mr. B. As can be seen from the registered schedules of Mr. A and Mr. B. shown in the above tables 3 and 4, it is possible that Mr. A and Mr. B who do not know each other (or know each other but do not know their mutual schedules in some case) may meet on their schedules. In this example, assume that Mr. A's attribute data match Mr. B's. Therefore, Mr. B's schedule data and attribute data are displayed as the other party's information in Mr. A's output list 91 shown in FIG. 8. With reference to FIG. 8, Mr. A's output list 91 includes a column 92 for displaying schedule data of Mr. A, a column 93 for displaying schedule data of the other party (i.e., including Mr. B), and a column 94 for displaying detailed attribute data of the other party.

With reference to FIG. 9, Mr. B's output list 95 includes a column for displaying Mr. B's schedule data, a column 97 for displaying the other party's (i.e., including Mr. A) schedule data, and a column 98 for displaying the other party's detailed attribute data.

As shown in FIGS. 8 and 9, since there are other people (Mr. E, Mr. X, Mr. W etc.) other than Mr. B and Mr. A who Mr. A and Mr. B may possibly meet with, respectively, as their respective other parties, schedule data and attribute data concerning those other people are also displayed.

Mr. A and Mr. B who have received the output lists shown in FIGS. 8 and 9, respectively, can be informed that there are their respective expecting parties on travels. Accordingly, Mr. A and Mr. B can communicate with their desired parties before starting to travel or during travelling. If they agree to meet each other, they can see each other while travelling.

The foregoing description has been made on one example of the manner of use of the information providing system shown in FIG. 1. A detailed description will now be made on a data processing in the information providing system shown in FIG. 1.

Figure 10:
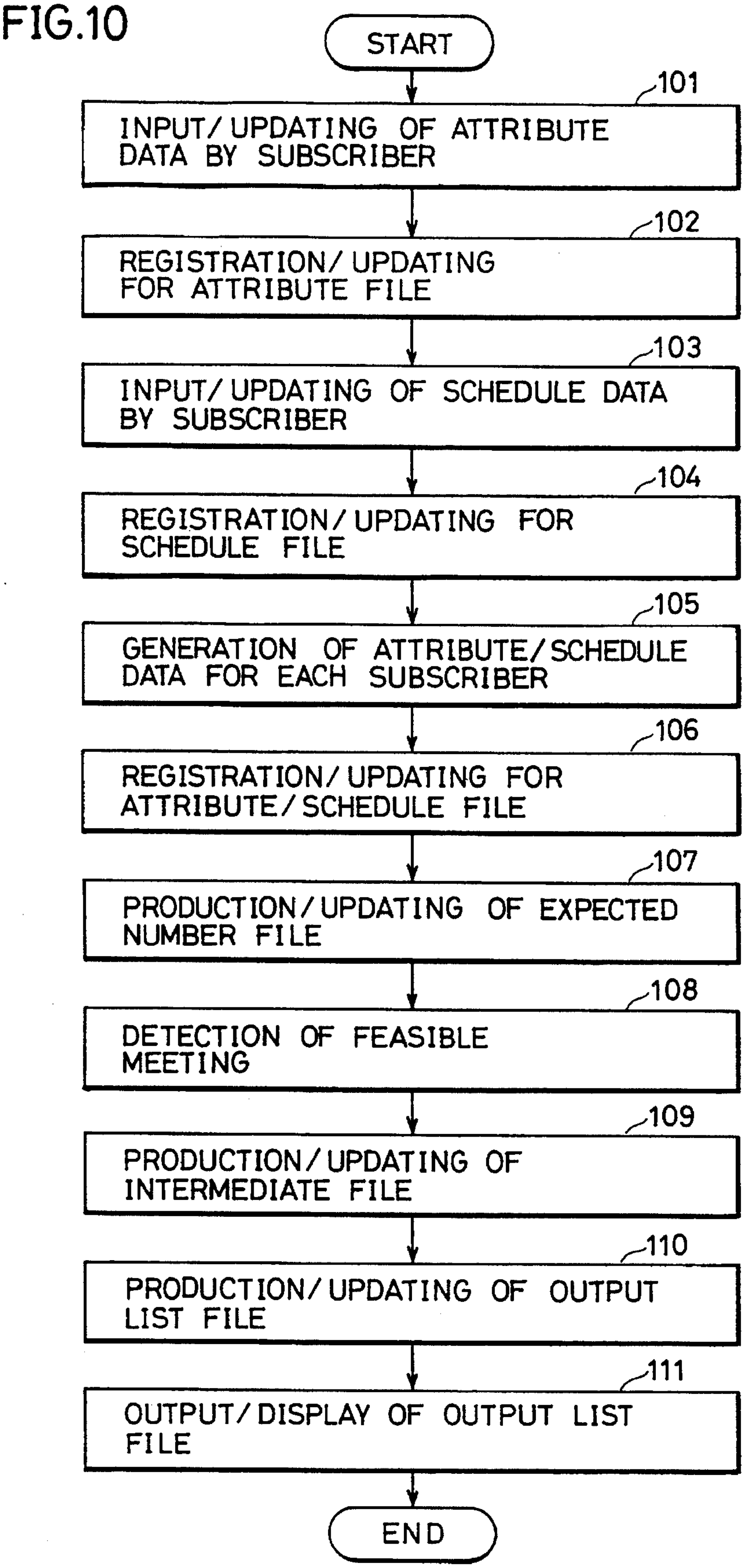
FIG. 10 is an overall flow chart showing a schematic processing flow in the information providing system shown in FIG. 1.

FIG. 10 is an overall flow chart showing a schematic processing flow in the information providing system shown in FIG. 1. With reference to FIG. 10, first, in a step 101, attribute data are input (or updated in some case) by a large number of users or subscribers. A subscriber inputs/updates self-attribute data and expected attribute data through input/output terminal 1 shown in FIG. 1. The input attribute data is transferred through communication network 2 to host computer 3.

In a step 102, data input processor 31 processes the transferred attribute data and registers or stores the processed attribute data in attribute file 41. In some case, the data in attribute file 41 is updated.

In a step 103, schedule data is input through input/output terminal 1 by the subscriber. In some case, the subscriber updates the schedule data. The input schedule data is transferred through communication network 2 to host computer 3.

In a step 104, data input processor 31 processes the transferred schedule data and registers the processed schedule data in schedule file 42. In some case, the schedule data in schedule file 42 is updated.

In a step 105, data coupling processor 32 couples two data stored via a common registrant number by referring to attribute file 41 and schedule file 42. That is, for each subscriber, attribute data and schedule data are coupled to each other (which will be described in detail later), and coupled attribute/schedule data is generated.

In a step 106, the generated attribute/schedule data is registered in attribute/schedule file 43. In some case, the attribute/schedule data in file 43 is updated.

In a step 107, expected number detecting processor 33 generates three expected number files 44, 45 and 46 by carrying out a processing which will be described later in detail. In some case, expected number files 44, 45 and 46 are updated.

In a step 108, feasible meeting detecting processor 34 detects a feasible meeting by carrying out a processing which will be described later in detail.

In a step 109, data concerning a feasible meeting is stored in intermediate file 47. In some case, the data stored in intermediate file 47 is updated.

In a step 110, data output processor 35 generates output data having a format suitable for an output by display unit 12 or printer 13, and stores the generated output data into an output list file 48. In some case, the data in output list file 48 is updated.

In a step 111, data output processor 35 responds to a request from input/output terminal 1 to refer to the data stored in output list file 48, and applies requested data through interface unit 30 and communication network 2 to input/output terminal 1.

A data format of the data stored in each of files 41 to 47 shown in FIG. 1 will now be described. The data stored in attribute file 41 has a data format shown in Table 5 below.

TABLE 5

| Registrant No. | Attribute Data | | | | |
|---|---|---|---|---|---|
| RN | $EA_1$ | $EA_2$ | $EA_3$ | $EA_4$ | ... |

With reference to Table 5, the data stored in attribute file 41 includes attribute data EA1, EA2, . . . provided for each registrant, i.e., each registrant number RN. Respective attribute data EA1, EA2, . . . correspond to attribute codes representing the attribute data described with reference to FIG. 3. That is, each of attribute codes EA1, EA2, . . . represents attributes of an expected person for the a registrant.

In the example shown in FIG. 3, a code representing the prefecture "Hiroshima Prefecture" from which a registrant (having his or her registrant number RN) comes is input as attribute code EA1, a code representing the city "Hiroshima City" from which the registrant comes is input as attribute code EA2, and a code representing the town "Funairi" from which the registrant comes is input as attribute code EA3. Other data shown in FIG. 3 (data numbers 02 to 04) are also input as attribute codes of the same registrant number RN in accordance with a predetermined coding.

Accordingly, attribute data input via data input area 14 shown in FIG. 3 is converted into an attribute code in data input processor 31 of FIG. 1, and thereafter, the converted attribute code is stored in the data format shown in Table 5 in attribute file 41. Similarly, when an alteration or updating of attribute data is requested, data input processor 31 alters or updates the attribute code stored in attribute file 41 in accordance with the request.

Schedule data stored in schedule file 42 shown in FIG. 1 has a data format shown in Table 6 below.

TABLE 6

| | Schedule Data | | | | | | |
|---|---|---|---|---|---|---|---|
| Registrant No. | Time | | Place | | | | |
| RN | TMA | TMB | $PL_1$ | $PL_2$ | $PL_3$ | $PL_4$ | ... |

With reference to Table 6, schedule data also includes time codes TMA and TMB and place codes PL1, PL2, . . . provided for each registrant, i.e., each registrant number RN. Time code TMA includes a code for determining the time/date/month/year for a registrant to start in a certain place. Time code TMB includes a code for determining the time/date/month/year for the registrant to end. Place codes PL1, PL2, . . . include a code for determining places sequentially from a larger area to a smaller area. That is, single schedule data stored in schedule file 42 represents that registrant RN stays at a place determined by place codes PL1, PL2, . . . during a period determined by starting time code TMA and ending time code TMB.

Therefore, schedule data input via data input area 16 shown in FIG. 5 is converted into a time code and a place code in data input processor 31 of FIG. 1 and is then stored in schedule file 42 for each registrant number.

The data stored in attribute/schedule file 43 has a data format shown in Table 7 below.

TABLE 7

| | | | | | Schedule Data | | | | | | | Registrant |
|---|---|---|---|---|---|---|---|---|---|---|---|---|
| Attribute Data | | | | | Time | | Place | | | | | No. |
| $EA_1$ | $EA_2$ | $EA_3$ | $EA_4$ | ... | TMA | TMB | $PL_1$ | $PL_2$ | $PL_3$ | $PL_4$ | ... | RN |

As can be seen from Table 7, the contents of attribute/schedule file 43 is obtained by coupling the attribute data and the schedule data stored in attribute file 41 and schedule file 42 in accordance with a predetermined processing. This coupling processing is made by data coupling processor 32 shown in FIG. 1. The data coupling processing is carried out on the basis of a flow chart shown in FIG. 11.

Figure 11:
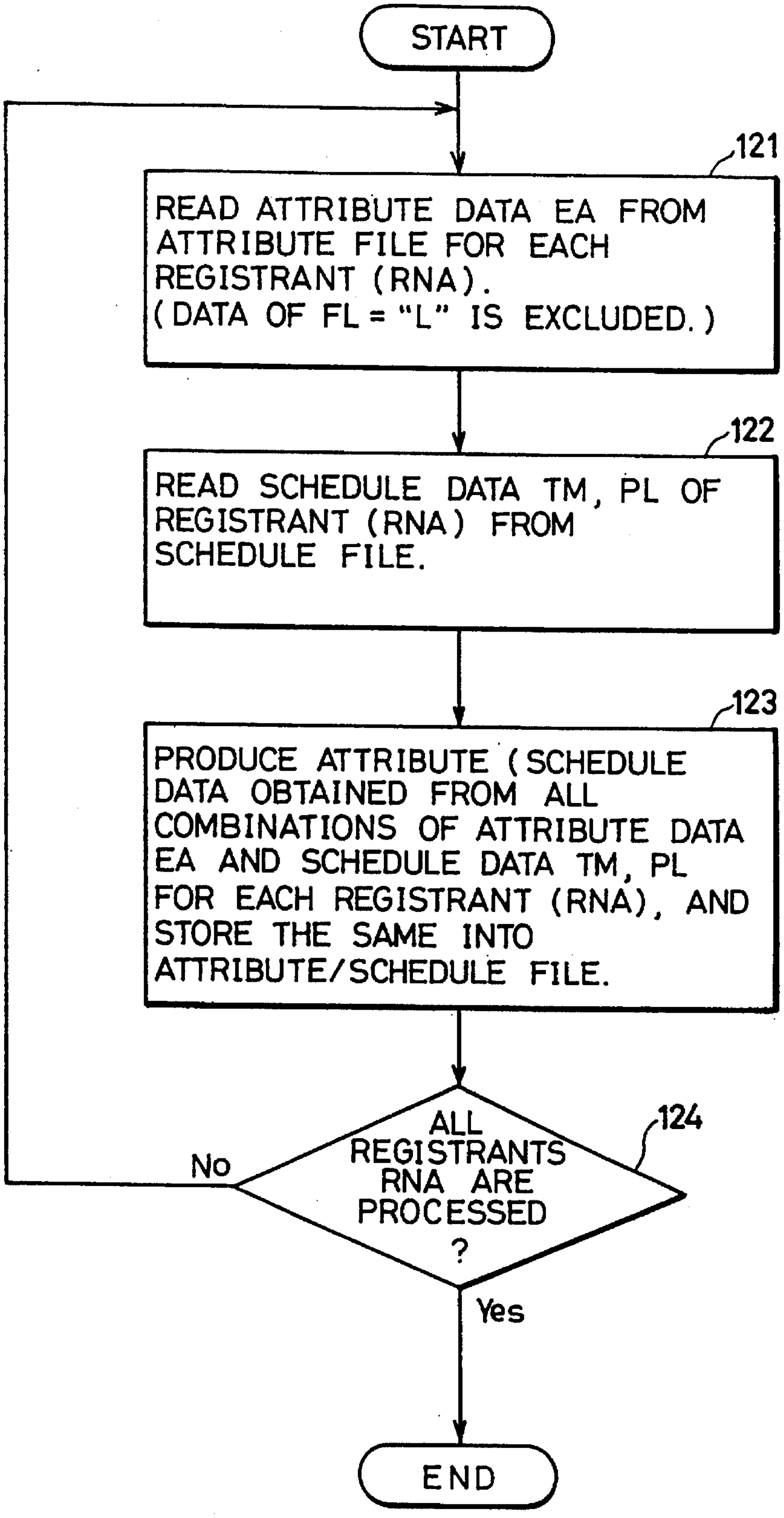
FIG. 11 is a flow chart showing a processing in a data coupling processor shown in FIG. 1.

FIG. 11 is a flow chart showing a processing in data coupling processor 32 shown in FIG. 1. With reference to FIG. 11, in a step 121, attribute data EA1, EA2, . . . are read for each one registrant number RNA by reference to attribute file 41. In a step 122, schedule data, i.e., time codes TMA and TMB and place codes PL1, PL2, . . . are read for each registrant number RNB by reference to schedule file 42.

In a step 123, attribute/schedule data which is obtained by all combinations of attribute data EA and schedule data TM and PL are produced for each registrant (RNA). The produced attribute/schedule data are stored in attribute/schedule file 43. Accordingly, in this step 123, attribute data EL and schedule data TM and PL are coupled to each other for each registrant, so that the coupled data are stored in attribute/schedule file 43.

In a step 124, it is determined whether the processings in steps 121 to 123 are carried out for all the registrants. If attribute data of a registrant which is not processed is left in attribute file 41, the processing returns to step 121. When the processings in steps 121 to 123 are completed for all the registrants, the above-described data coupling processing is completed. This results in generation of coupled data having the data format shown in Table 7 in attribute/schedule file 43 shown in FIG. 1.

A description will now be made on a processing carried out in expected number detecting processor 33 shown in FIG. 1. Prior to this description, a description will first be made on a data format of data generated in an expected number detecting processing, i.e., a data format of data stored in expected number files 44, 45 and 46 shown in FIG. 1.

Table 8 below shows a data format of data stored in a first expected number file 44.

TABLE 8

| Attributes | | | | | Expected Number |
|---|---|---|---|---|---|
| $EA_1$ | $EA_2$ | $EA_3$ | $EA_4$ | ... | ENA |

With reference to Table 8, single data stored in first expected number file 44 includes attribute codes and the number of registrants who expect common attributes. Attribute data includes attribute codes EA1, EA2, . . . as already described. Attribute codes EA1, EA2, . . . are used as a first retrieval key KA for use in detecting a first expected number, as will be described later.

Data stored in a second expected number file 45 has a data format shown in Table 9 below.

TABLE 9

| Attributes | | | | | Time | | Expected Number |
|---|---|---|---|---|---|---|---|
| $EA_1$ | $EA_2$ | $EA_3$ | $EA_4$ | . . . | TMA | TMB | ENB |

With reference to Table 9, single data stored in second expected number file 45 includes attribute codes EA1, EA2, . . . , time codes TMA and TMB, and expected number data ENB. That is, expected number data ENB corresponds to the number of registrants who have common attribute codes and common time codes.

Data stored in a third expected number file 46 has a data format shown in Table 10 below.

KB is comprised of attribute codes EA1, EA2, . . . and time codes TMA and TMB shown in Table 9.

In a step 135, the number of registrants who have the same retrieval key code is counted for each retrieval key KB by reference to attribute/schedule file 43. Accordingly, the number of registrants who have the same attribute data and the same time code is obtained as expected number data ENB.

In a step 136, expected number data ENB is written for each retrieval key KB in expected number file 45. Thus, data having the data format shown in Table 9 is stored in second expected number file 45.

Figure 14:
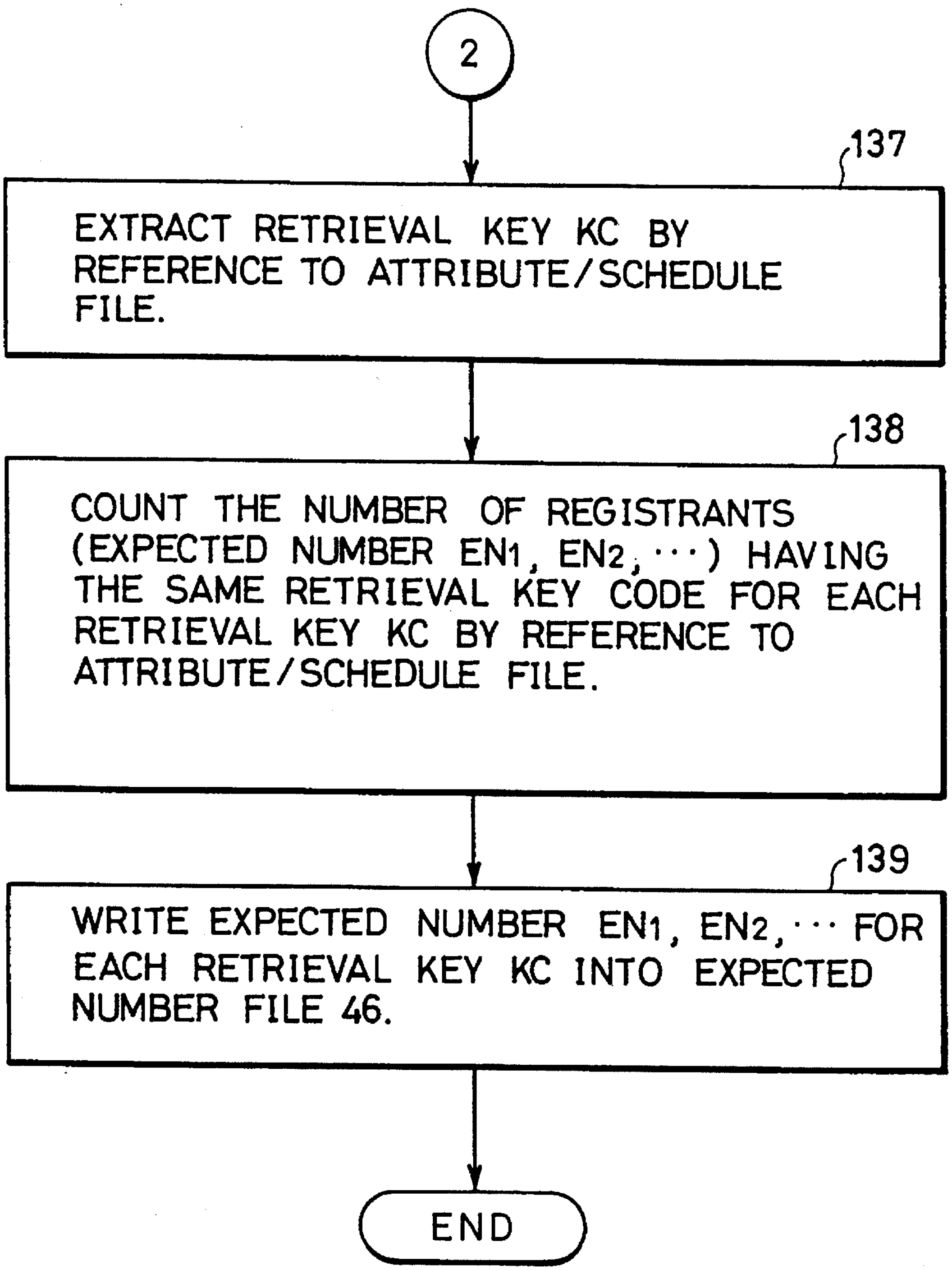
FIG. 14 is a flow chart showing a generating processing of an expected number file 46 in the expected number detecting processor shown in FIG. 1.

FIG. 14 is a flow chart showing a generation processing of a third expected number file 46 in expected number detecting processor 33 shown in FIG. 1. With reference to FIG. 14, a third retrieval key KC is extracted by reference to attribute/schedule file 43 in a step 137. Third retrieval key KC is comprised of attribute codes EA1, EA2, . . . and place codes PL1, PL2, shown in Table 10.

In a step 138, the number of registrants who have the same retrieval key code is counted for each retrieval key KC by reference to attribute/schedule file 43. As described above,

TABLE 10

| Attributes | | | | | Place | | | | | Expected Number | | | | |
|---|---|---|---|---|---|---|---|---|---|---|---|---|---|---|
| $EA_1$ | $EA_2$ | $EA_3$ | $EA_4$ | . . . | $PL_1$ | $PL_2$ | $PL_3$ | $PL_4$ | . . . | $EN_1$ | $EN_2$ | $EN_3$ | $EN_4$ | . . . |

With reference to Table 10, single data stored in a third expected number file 46 includes attribute codes EA1, EA2, . . . , place codes PL1, PL2, . . . , and expected number data EN1, EN2, . . . For example, expected number data EN1 corresponds to the number of registrants who have common attribute codes EA1, EA2, . . . and common place code PL1. Expected number code EN2 corresponds to the number of registrants who have common attribute codes EA1, EA2, . . . and common place codes PL1 and PL2. In addition, expected number code EN3 corresponds to the number of registrants who have common attribute codes EA1, EA2, . . . and common place codes PL1, PL2 and PL3. Another expected number data EN4 also corresponds to the number of registrants according to a similar rule.

Figure 12:
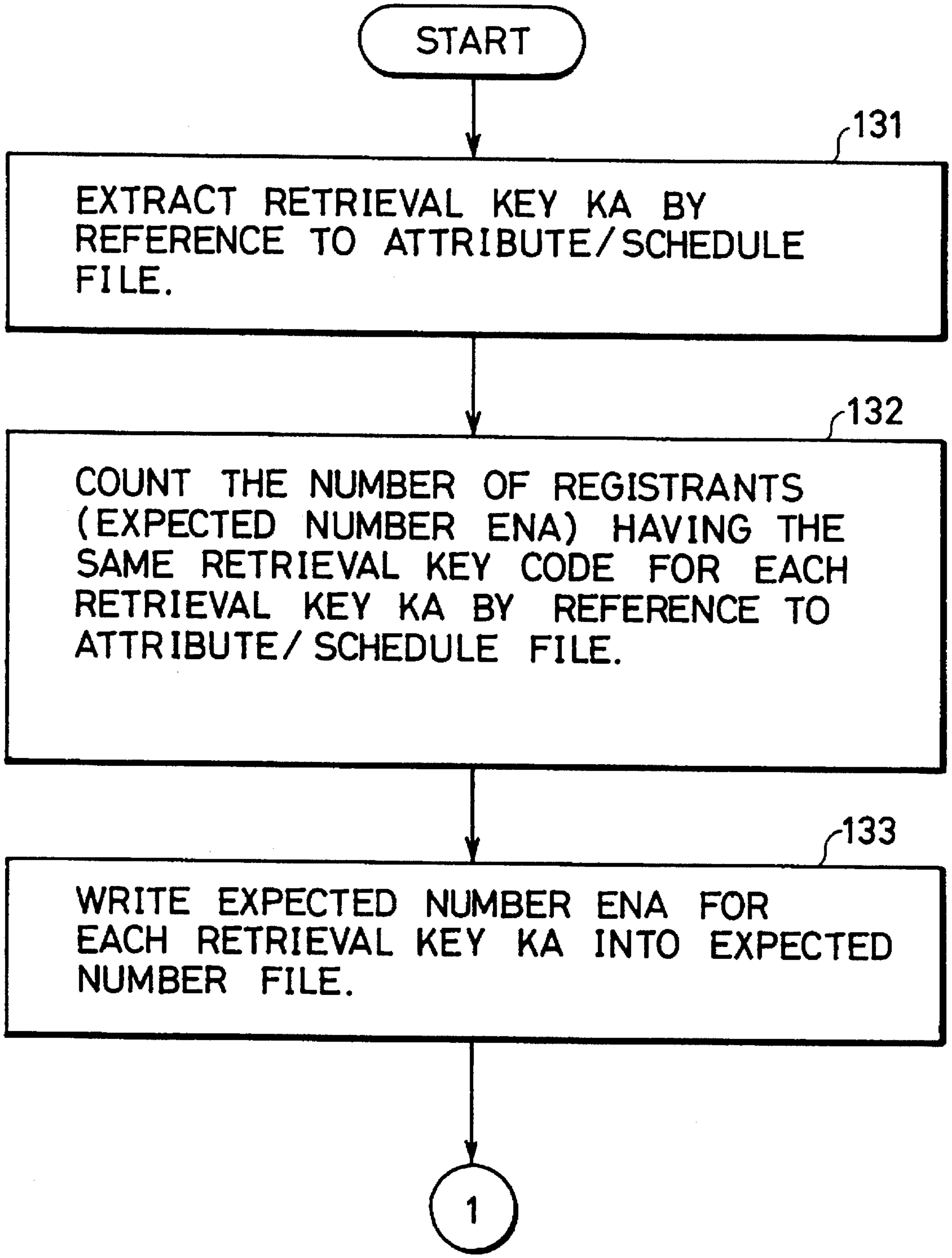
FIG. 12 is a flow chart showing a generation processing of an expected number file 44 in an expected number detecting processor shown in FIG. 1.

FIG. 12 is a flow chart showing a generation processing of expected number file 44 in expected number detecting processor 33 shown in FIG. 1. With reference to FIG. 12, first, in a step 131, a first retrieval key KA is extracted by reference to attribute/schedule file 43. First retrieval key KA is comprised of attribute codes EA1, EA2, . . . as mentioned above.

In a step 132, the number of registrants who have the same retrieval key code is counted for each retrieval key KA by reference to attribute/schedule file 43. That is, the number of registrants who have registered the same attribute data is obtained as expected number data ENA.

In a step 133, expected number data ENA is stored in expected number file 44 for each retrieval key KA. That is, data having the data format shown in Table 8 is stored in expected number file 44.

Figure 13:
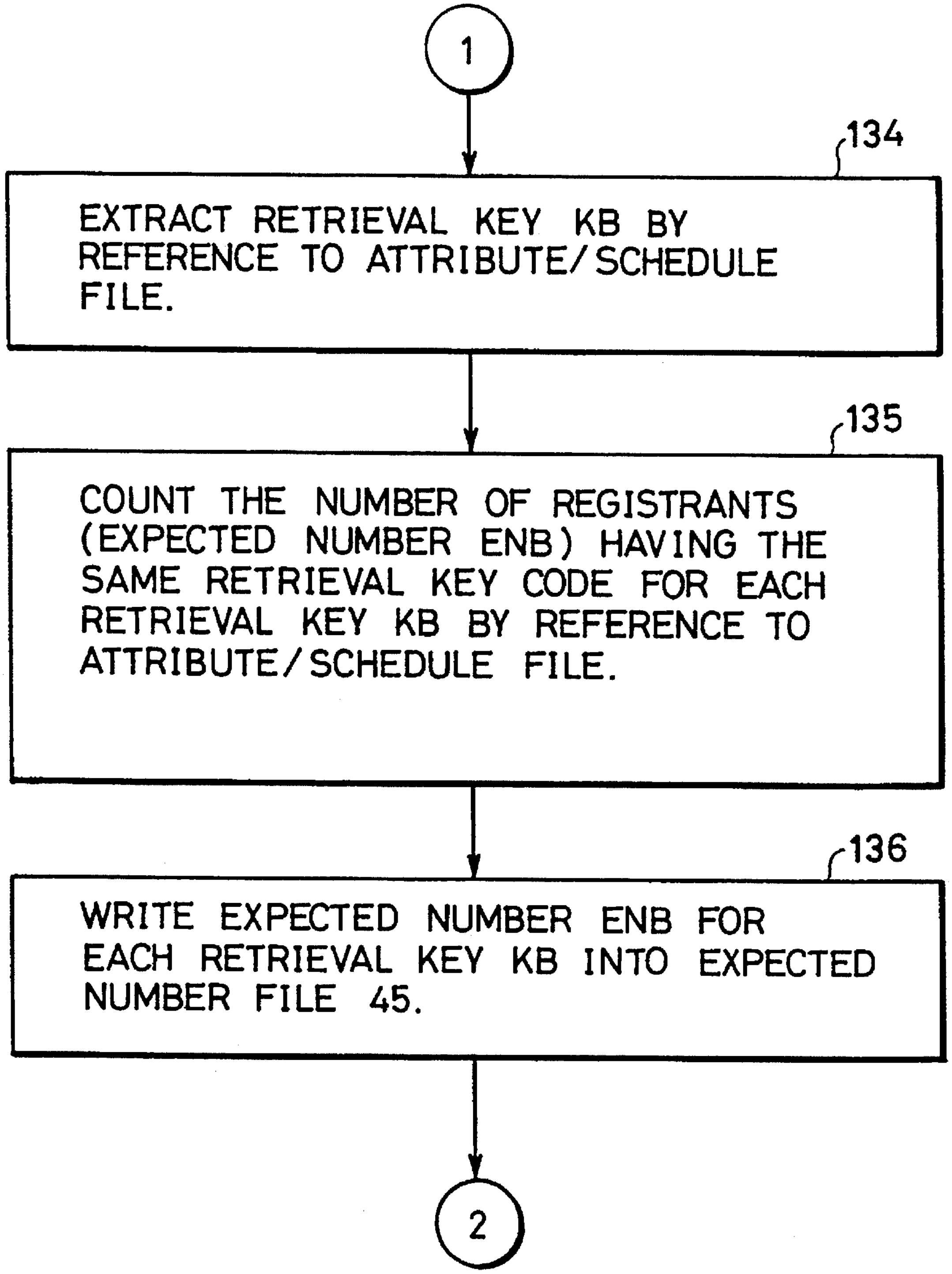
FIG. 13 is a flow chart showing a generating processing of an expected number file 45 in the expected number detecting processor shown in FIG. 1.

FIG. 13 is a flow chart showing a generation processing of expected number file 45 in expected number detecting processor 33 shown in FIG. 1. With reference to FIG. 13, in a step 134, a second retrieval key KB is extracted by reference to attribute/schedule file 43. Second retrieval key expected number data EN2, for example, corresponds to the number of registrants who have common attribute codes EA1, EA2, . . . and common place codes PL1, PL2. Similarly, expected number data EN4 corresponds to the number of registrants who have common attribute codes EA1, EA2, . . . and common place codes PL1 to PL4.

In a step 139, expected number data EN1, EN2, . . . are written for each retrieval key KC in expected number file 46. Accordingly, data having the data format shown in Table 10 is stored in third expected number file 46.

Figure 15:
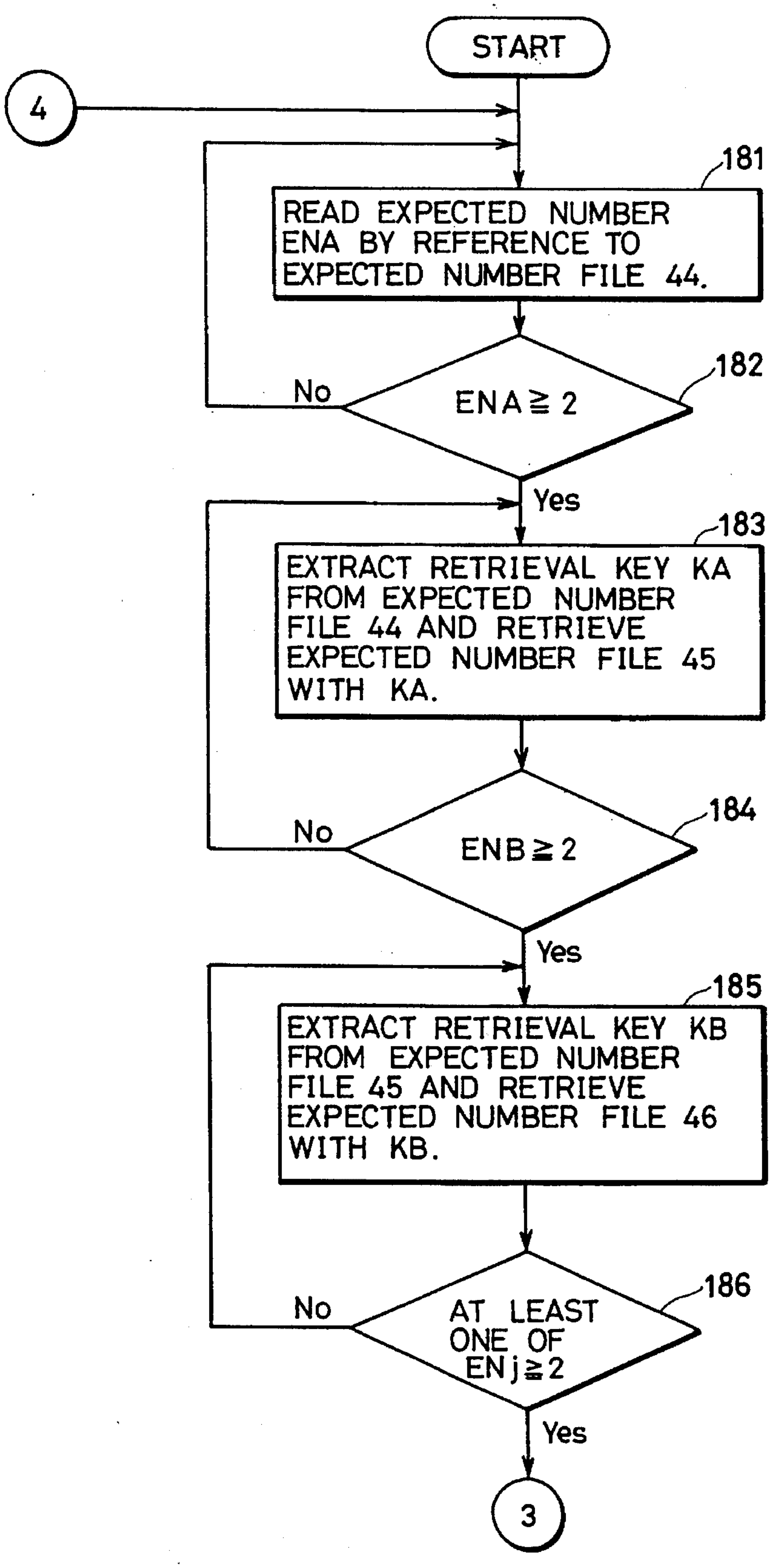
FIGS. 15 and 16 are flow charts showing a processing in a feasible meeting detecting processor shown in FIG. 1.

A processing carried out in feasible meeting detecting processor 34 shown in FIG. 1 will now be described. With reference to FIG. 15, expected number data ENA is read by reference to expected number file 44 in a step 181.

It is determined in a step 182 that read data ENA is not lower than "2". When data ENA is "1", the processing returns to step 181. When a relation ENA≧"2" is satisfied, the processing proceeds to a step 183.

In step 183, a first retrieval key KA having expected number ENA not lower than "2" is extracted from expected number file 44, and expected number file 45 is retrieved with retrieval key KA. Thus, expected number data ENB having retrieval key KA is read from expected number file 45.

In a step 184, it is determined whether expected number data ENB is not lower than "2". If data ENB is "1", the processing returns to step 183. If a relation ENB≧"2" is satisfied, the processing proceeds to a step 185.

In step 185, a second retrieval key KB is extracted from expected number file 45, and expected number file 46 is retrieved with retrieval key KB. Accordingly, expected number data ENj (j=1, 2, . . . ) is read.

A determination is made in a step 186 as to whether all data ENj are not lower than "2". When at least one data ENj is "1", the processing returns to step 185. When all data ENj satisfy a relation ENj≧2, the processing proceeds to a step 187 shown in FIG. 19.

In step 187, retrieval data for retrieving attribute/schedule file 43 is generated with combinations of attribute code EA, time code TM and place code PL.

In a step 188, registrant numbers RNA, RNB, . . . are extracted by retrieving of attribute/schedule file 43 with retrieval data.

In a step 189, intermediate file data are generated for all combinations of extracted registrant numbers, and generated data are stored in intermediate file 47.

In a step 190, a determination is made as to whether all data in expected number file 44 are processed or not. When any data is left, the processing returns to step 181 shown in FIG. 15. When all data in expected number file 44 are processed, the processing in feasible meeting detecting processor 34 shown in FIG. 1 is completed.

Figure 16:
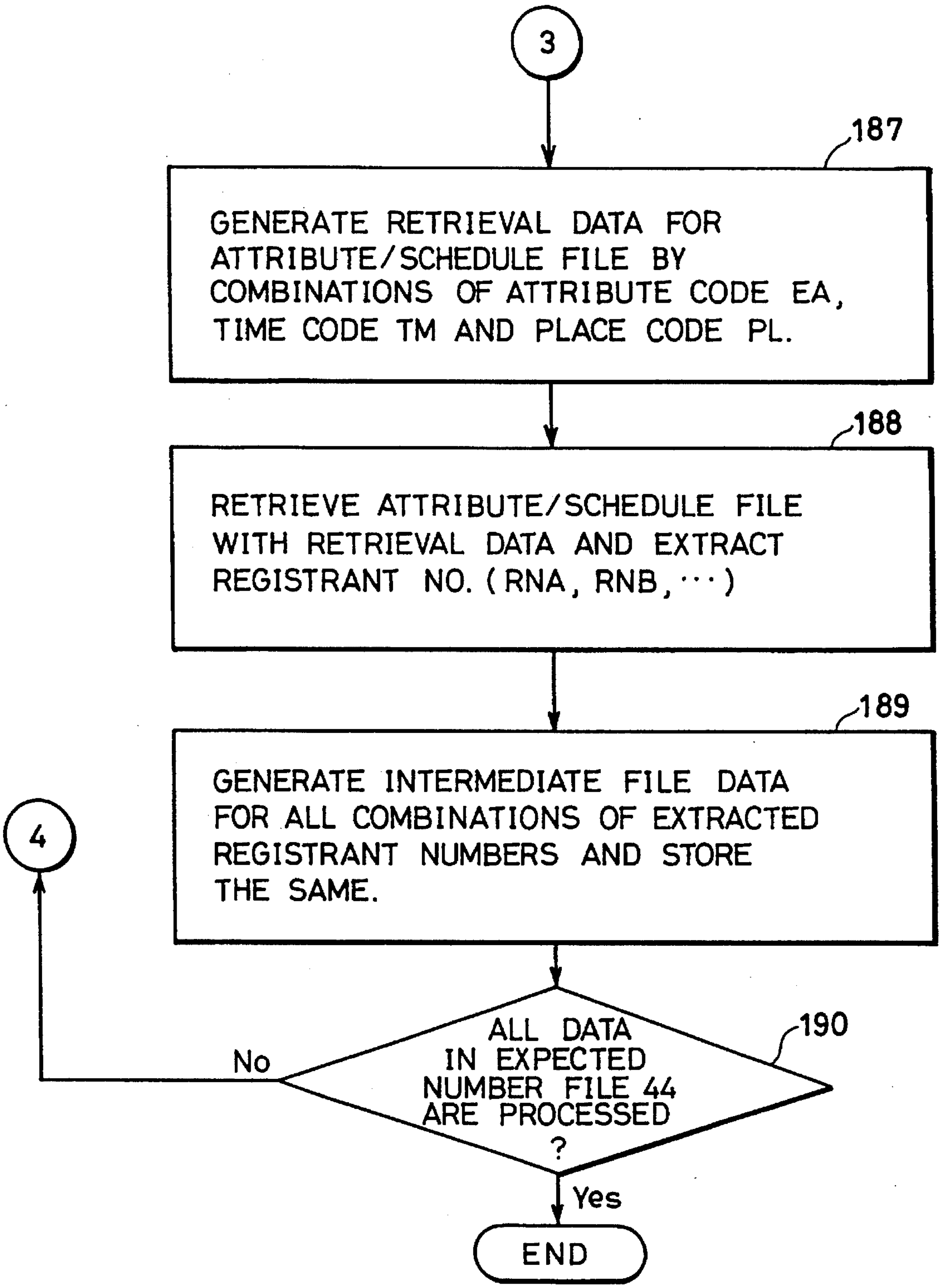

A data format of data generated as the result of the feasible meeting detection processing shown in FIGS. 15 and 16 is represented in Table 11 below. That is, the data format shown in Table 1 corresponds to the data format of the data stored in intermediate file 47 shown in FIG. 1.

read for each registrant by reference to intermediate file 47. In the example shown in FIG. 8, schedule information and attribute information concerning Mr. B and Mr. E are read from intermediate file 47.

In a step 165, the read other party information is written in the data format suitable for constituting the output list into output list file 48. As the result of data writing in steps 163 and 165, data having a data format suitable for outputting the output list shown in FIG. 8, for example, is formed in output list file 48.

A determination is made in a step 166 as to whether there are any other registrants left as the other party. If some other party is left, the processing returns to step 164. If no other party is left, the processing proceeds to a step 167.

In step 167, it is determined whether there remain in intermediate file 47 any other registrants who are not subjected to the processings in steps 162 to 166. If some registrant is left, the processing returns to step 162. If there is no registrant left, the output list file data generation processing shown in FIG. 16 is completed.

The foregoing description has been made on the detailed

TABLE 11

| Registrant No. | The Other Party's No. | Attribute Data of the Other Party | | | | | Schedule Data of the Other Party | | | | | | |
|---|---|---|---|---|---|---|---|---|---|---|---|---|---|
| | | | | | | | Time | | Place | | | | |
| RNA | RNB | $EA_1$ | $EA_2$ | $EA_3$ | $EA_4$ | . . . | TMA | TMB | $PL_1$ | $PL_2$ | $PL_3$ | $PL_4$ | . . . |

With reference to Table 11, single data stored in intermediate file 47 includes the other party's registrant number data provided for each registrant number RNA, the other party's attribute data and the other party's schedule data. The other party's number data RNB corresponds to a registration number of a person who registrant RNA may possibly meet with while travelling. The other party's attribute data and schedule data as well as the other party's number data RNB are stored in intermediate file 47. That is, other party attribute data includes other party attribute codes EA1, EA2, . . . The other party schedule data includes the other party's time codes TMA and TMB and place codes PL1 and PL2, . . .

Consequently, intermediate file 47 stores therein, for each registrant, information regarding the person who the registrant might see while travelling. Output list file 48 is produced in the following procedure by reference to intermediate file 47.

Figure 17:
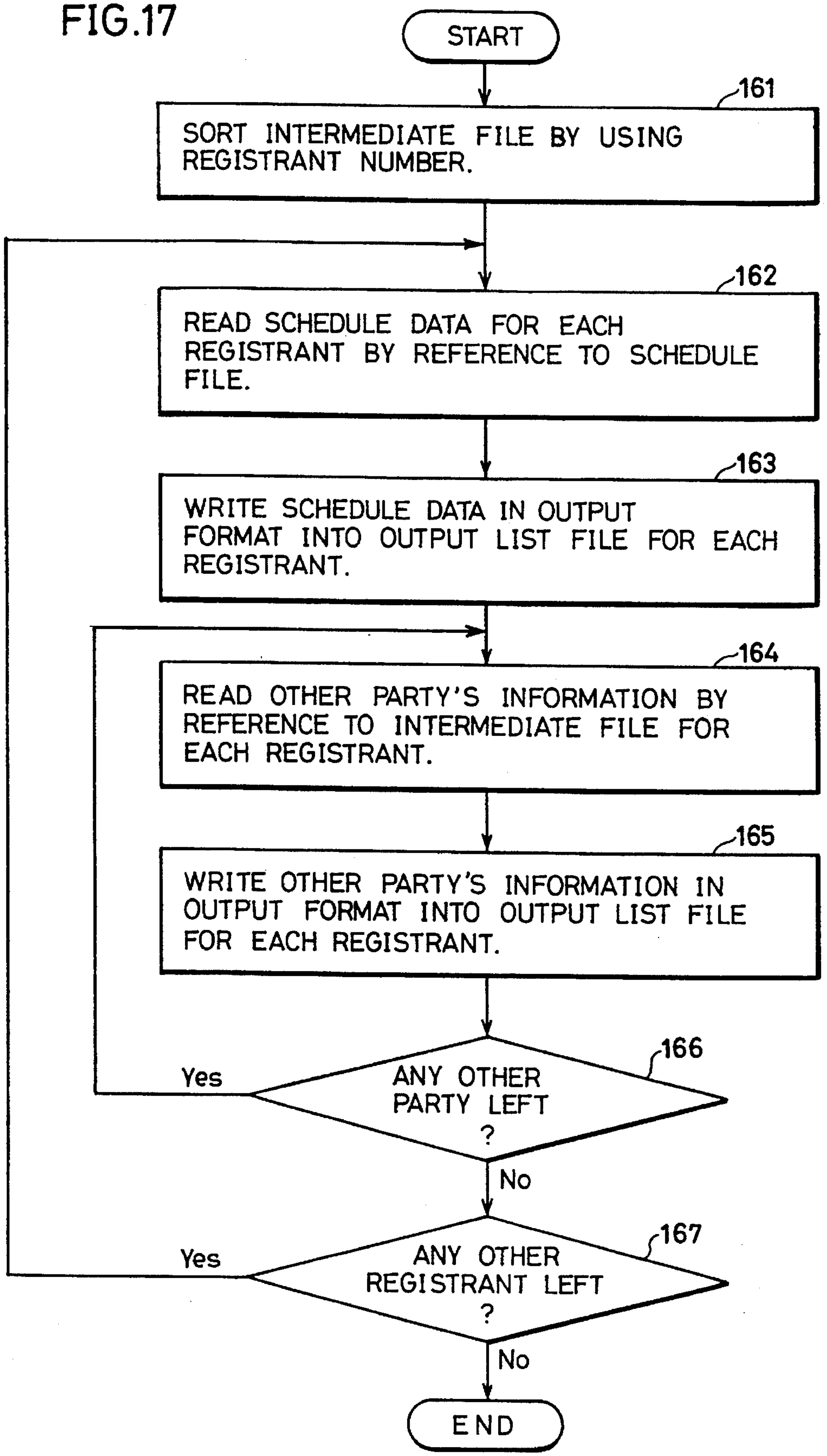
FIG. 17 is a flow chart for use in generating data to be stored in the output list file shown in FIG. 1.

FIG. 17 is a flow chart for use in generating data stored in output list file 48 shown in FIG. 1. With reference to FIG. 17, in a step 161, sorting of data stored in intermediate file 47 is made by using registrant numbers. As a result, data as to the same registrant are concentrated in intermediate file 47, and accesses of data with respect to one registrant can easily be made.

In a step 162, schedule data is read by reference to schedule file 42 for each registrant existing in intermediate file 47. That is, data necessary to constitute the output lists shown in FIGS. 8 and 9 are read for each registrant.

In a step 163, read schedule data are written in an output format in the output list file for each registrant. In the example shown in FIG. 8, for example, Mr. A's schedule data is written in a data format which is suitable for constituting the output list of FIG. 8, in output list file 48.

In a step 164, information as to the feasible other party is processings in steps 101 to 110 shown in the overall flow chart of FIG. 10. The processings in steps 101 to 110 shown in FIG. 10 are carried out at predetermined time intervals, for example, once in a day or twice in a day in some case. The user can obtain latest information by referring to output list file 48.

In addition to intermediate file 47, intermediate file data one generation before, i.e., one generation older is also stored in old intermediate file 49. By comparing data in latest intermediate file 47 and that in old intermediate file 49, feasible meeting detection processor 34 is able to detect that a realizable meeting newly occurs or does not occur. Information as to such a new realizable meeting is also reported to subscribers through input/output terminals 1.

Accordingly, a subscriber who has completed his or her attribute data registration and schedule data registration can obtain the latest output list by making access again to this information providing system via input/output terminals 1 after a predetermined time interval has passed. That is, when a certain subscriber requests an output of an output list via input/output terminals 1, data output processor 35 refers to output list file 48 thereby to transfer the output list data requested by the subscriber toward the input/output terminals. The subscriber can obtain information as to the other party during his or her travel by referring to an output list displayed on display unit 12. The output list is allowed to be output even via printer 13 if necessary.

In such a manner, if the subscriber makes access to the information providing system shown in FIG. 1, then the subscriber can obtain the output lists shown in, for example, FIGS. 8 and 9. By referring to the output lists, the subscriber recognizes that it is possible to meet with a person who the subscriber expects to meet on his or her travel schedule. The subscriber can communicate with a desired person prior to or during travel, so that an expected meeting can be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information providing apparatus for providing subscribers through a communication network with information required for arranging a meeting with a desired person, said apparatus comprising:

attribute/schedule storing means for storing therein, for each of the subscribers, first attribute data and schedule data, and for storing second attribute data of the desired person who is to be met, and the schedule data includes for each of the subscribers and the desired person, movement data indicating movement from a first location to a second location including a movement time and movement date, and location data indicating a future location including a location time and a location date;

subscriber selecting means for selecting one of the subscribers having the first attribute data substantially in common with the second attribute data of the desired person by referring to said attribute/schedule storing means;

information accumulating means responsive to said subscriber selecting means for accumulating personal information of the desired person for the one of the subscribers selected by said subscriber selecting means; and information providing means for providing the one of the subscribers selected, through said communication network, with the personal information accumulated by said information accumulating means together with the location and movement data for arranging the meeting with the desired person.

2. The information providing apparatus as recited in claim 1, wherein said subscriber selecting means includes:

shared attribute detecting means for detecting attribute data shared with a plurality of subscribers by referring to said attribute/schedule storing means, shared schedule detecting means for detecting schedule data shared with a plurality of subscribers by referring to said attribute/schedule storing means, and subscriber detecting means for detecting said specific subscriber by referring to said attribute/schedule storing means with the shared attribute data and the shared schedule data detected by said shared attribute detecting means and said shared schedule detecting means.

3. The information providing apparatus as recited in claim 2, wherein said subscriber detecting means includes:

retrieval data generating means for generating retrieval data for use in retrieving said attribute/schedule storing means by combining the shared attribute data and the shared schedule data detected by said shared attribute detecting means and said shared schedule detecting means, and attribute/schedule retrieval means for retrieving said attribute/schedule storing means with retrieval data to detect said specific subscriber.

4. The information providing apparatus as recited in claim 1, further comprising:

attribute storing means for storing therein, for each subscriber, attribute data of a subscriber and attribute data of a person who is expected to meet;

schedule storing means for storing schedule data on travel for each subscriber; and data coupling means for coupling corresponding data of the same subscriber by referring to said attribute storing means and said schedule storing means, wherein said attribute/schedule storing means stores therein for each subscriber the data coupled by said data coupling means.

5. The information providing apparatus as recited in claim 1, wherein said attribute data includes at least one of data designating birthplace, alma mater, occupation and interest of the expected person.

6. The information providing apparatus as recited in claim 1, wherein said schedule data includes a plurality of area designating data for designating sequentially smaller geographic areas for arranging the meeting.

7. The information providing apparatus as recited in claim 1, wherein said information providing means includes information transfer means connected to said communication network for transferring the information accumulated by said information accumulating means through said communication network, and information display means connected to said communication network for displaying to subscribers the information transferred from said information transfer means.

8. The information providing apparatus as recited in claim 6, wherein said information accumulating means includes output format data storing means for storing therein information of an expected person and self-information in a data format suitable for a display format by said information display means.

9. The information providing apparatus as recited in claim 1, wherein said self-information accumulated by said information accumulating means includes self-schedule data of a subscriber, and said expected person information accumulated by said information accumulating means includes schedule data and attribute data of said expected person.

10. An information providing system for providing subscribers through a communication network with communication required for arranging a meeting with a desired person, said system comprising:

a plurality of input/output terminal units for receiving a request from said subscribers;

each said input/output terminal units including a keyboard unit for inputting first attribute data of a corresponding subscriber, second attribute data of a desired person, and schedule data of the corresponding subscriber, and a display unit for displaying information;

a host computer connected via said communication network to said plurality of input/output terminal units, for generating, for each of the subscribers, information required for arranging the meeting with the desired person, said host computer including:

attribute/schedule storing means for storing therein the first attribute data and the schedule data input from said input/output terminal units for each of the subscribers, and for storing second attribute data of the desired person who is to be met, and the schedule data includes for each of the subscribers and the desired person, movement data indicating movement from a first location to a second location including a movement time and a movement date, and location data indicating a future location including a location time and a location date;

subscriber selecting means for selecting one of the subscribers having the first attribute data substantially in common with the second attribute data of the desired person by referring to said attribute/schedule storing means;

information accumulating means responsive to said subscriber selecting means for accumulating personal information of the desired person for the one of the subscribers selected by said subscriber selecting means; and information transfer means responsive to the request from a subscriber input to said input/output terminal units, for transferring the personal information of the desired person and the corresponding subscriber, accumulated by said information accumulating means together with the location and movement data for arranging the meeting with the desired person, to a corresponding input/output terminal, said corresponding input/output terminal displaying on a corresponding display unit the personal information of the desired person of said corresponding subscriber, transferred from said information transfer means.

11. An information providing apparatus for providing subscribers through a communication network with information required for arranging a meeting with a desired person, said apparatus comprising:

attribute storing means for storing therein first attribute data of a subscriber and second attribute data of the desired person for each of the subscribers;

schedule storing means for storing therein schedule data on travel for each of the subscribers, the schedule data includes for each of the subscribers and the desired person movement data indicating movement from a first location to a second location including a movement time and a movement date, and location data indicating a future location including a location time and a location date;

subscriber selecting means for selecting one of the subscribers having the first attribute data substantially in common with the second attribute data of the desired person by referring to said attribute storing means and said schedule storing means;

information accumulating means responsive to said subscriber selecting means for accumulating personal information of the desired person for the one of the subscribers selected; and information providing means for providing the one of the subscribers through said communication network with the personal information accumulated by said information accumulating means together with the location and movement data for arranging the meeting with the desired person.

12. The information providing apparatus as recited in claim 11, wherein said subscriber selecting means selects the one of the subscribers having the first attribute data and the schedule data substantially in common with the second attribute data of the desired person.

13. The information providing apparatus as recited in claim 11, wherein the schedule data of the desired person and the one of the subscribers selected is displayed together for simultaneous viewing by the one of the subscribers for arranging the meeting in the future.

* * * * *